United States Patent
Ogawa

(10) Patent No.: US 7,259,663 B2
(45) Date of Patent: Aug. 21, 2007

(54) WHEEL STATE ADJUSTMENT SYSTEM AND METHOD THEREOF

(75) Inventor: Atsushi Ogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 379 days.

(21) Appl. No.: 11/094,410

(22) Filed: Mar. 31, 2005

(65) Prior Publication Data

US 2005/0231344 A1    Oct. 20, 2005

(30) Foreign Application Priority Data

Apr. 14, 2004    (JP) .............................. 2004-119152

(51) Int. Cl.
| | |
|---|---|
| B60C 23/00 | (2006.01) |
| B60C 23/02 | (2006.01) |
| B60C 19/00 | (2006.01) |
| B60C 8/02 | (2006.01) |
| B60C 23/10 | (2006.01) |

(52) U.S. Cl. .............. 340/442; 340/443; 340/444; 340/445; 340/446; 340/447; 340/448; 73/146.2; 73/146.3; 73/146.4; 73/146.5; 73/146.8; 152/152.1; 152/415; 152/416; 152/418

(58) Field of Classification Search ........ 340/442–448; 73/146.2, 146.3, 146.4, 146.5; 152/152.1, 152/415–419
See application file for complete search history.

(56) References Cited

U.S. PATENT DOCUMENTS

| | | | | |
|---|---|---|---|---|
| 5,587,698 A | * | 12/1996 | Genna | ........................ 340/442 |
| 5,940,781 A | * | 8/1999 | Nakajima | ..................... 702/98 |
| 6,112,165 A | | 8/2000 | Uhl et al. | |
| 6,144,295 A | * | 11/2000 | Adams et al. | .............. 340/442 |
| 6,259,360 B1 | | 7/2001 | Takamura | |
| 2005/0045259 A1 | * | 3/2005 | Hottebart et al. | ........... 152/415 |

FOREIGN PATENT DOCUMENTS

| | | |
|---|---|---|
| DE | 199 61 020 A1 | 6/2000 |
| EP | 0 601 556 A1 | 6/1994 |
| JP | A 07-137515 | 5/1995 |
| JP | A 2003-94917 | 4/2003 |
| WO | WO 2004/016455 A2 | 2/2004 |

* cited by examiner

Primary Examiner—Benjamin C. Lee
Assistant Examiner—Lam Pham
(74) Attorney, Agent, or Firm—Oliff & Berridge, PLC

(57) ABSTRACT

A pressure detection sensor for detecting a tire internal air pressure and a wheel side communication device for transmitting a detection result of the pressure detection sensor using a preset transmission mode are provided on each wheel. The detection result from the pressure detection sensor is transmitted to an ECU via a vehicle body side communication device provided on a vehicle body. The ECU is able to notify a transmission mode determination device provided on each wheel that adjustment of the tire internal air pressure is being performed by manipulating a state of the tire internal air pressure. The transmission mode determination device determines a transmission mode to be used by the wheel side communication device such that a transmission frequency of a notification related to the occurrence of an abnormality of the wheel is reduced while adjustment of the tire internal air pressure is being performed.

19 Claims, 8 Drawing Sheets

WHEEL STATE ADJUSTMENT SYSTEM AND METHOD THEREOF

INCORPORATION BY REFERENCE

The disclosure of Japanese Patent Application No. 2004-119152 filed on Apr. 14, 2004 including the specification, drawings and abstract is incorporated herein by reference in its entirety.

BACKGROUND OF THE INVENTION

1. Field of Invention

The invention relates to a wheel state adjustment system and a wheel state adjustment method for adjusting a predetermined quantity of state of a wheel, which may be, for example, an internal air pressure of a tire.

2. Description of Related Art

As noted in Japanese Patent Application Publication No. JP-A-7-137515 and No. JP-A-2003-94917, it is desirable to monitor various quantities of state of a wheel, such as an internal air pressure of a tire, in order to maintain the wheel in an appropriate state and achieve comfortable running of a vehicle. Accordingly, various related methods have been proposed for monitoring wheel quantities of state, like changes in the internal air pressure within the tire.

Many of the disclosed systems for monitoring wheel quantities of state and maintaining them appropriately, detect a wheel quantity of state such as the internal air pressure of the tire by using (a) sensors attached to a vehicle body, or (b) sensors provided in integrated units with vehicle instruments attached to the vehicle body.

However, recently, systems are being widely adopted that use sensors provided on each wheel to detect the respective wheel quantity of state such as the internal air pressure of the tire, and then transmit the detection results to an Electronic Control System (ECU), or the like, provided on the vehicle body. Such systems are epitomized by Tire Pressure Monitoring Systems (TPMS). In these systems, the sensors provided on each wheel are usually capable of switching between different operating modes depending on the wheel quantity of state. For example, some TPMS utilize sensors that switch between (a) infrequent detection of the wheel quantity of state at normal times, and (b) frequent detection of the wheel quantity of state when it is determined that an abnormality is likely to have occurred. By adopting such a configuration, it is possible to improve safety.

However, the sensors provided on the wheels often use a battery provided on each wheel as an energy supply rather than a battery provided on the vehicle body. Accordingly, in order to enable the sensors to be operated over extended periods using the respective wheel batteries, it is important to operate the sensors efficiently and reduce energy consumption. For example, some TPMS pro-actively adjust the tire internal air pressure to an appropriate level to suit the road being run along. With such systems, however, there is a possibility that use of this pro-active adjustment of the tire internal air pressure will cause the sensors to operate improperly and frequently detect the wheel quantity of state and transmit the detection results even when there is no likelihood that the wheel is in an abnormal state. However, as will be apparent, from the point of view of reducing energy consumption it is clearly undesirable if the sensors operate improperly and detect the wheel quantities of state more than necessary.

SUMMARY OF THE INVENTION

It is an object of the invention to provide a wheel state adjustment system and wheel state adjustment method that enable a predetermined quantity of state of a wheel to be appropriately monitored and adjusted.

According to a first aspect of the invention, a wheel state adjustment system includes: a wheel state monitoring device which monitors a predetermined quantity of state of a wheel, and which transmits a notification when an abnormality of the wheel occurs; and a wheel state adjustment device that adjusts the predetermined quantity of state of the wheel. In the first aspect, the wheel state monitoring device reduces a transmission frequency at which the notification related to the occurrence of an abnormality of the wheel is transmitted when the wheel state adjustment device is adjusting the predetermined quantity of state of the wheel.

According to the wheel state adjustment system of the first aspect, it is possible to (i) monitor the predetermined quantity of state of the wheel, (ii) transmit the notification related to the occurrence of an abnormality, and (iii) adjust the predetermined quantity of state of the wheel. Further, by reducing the transmission frequency of the notification related to the occurrence of an abnormality of the wheel while the wheel state adjustment device is adjusting the predetermined quantity of state of the wheel, it is possible to reduce the amount of energy that is consumed by transmitting the notification related to the occurrence of an abnormality of wheel.

Note that, the term "predetermined quantity of state of the wheel" as used in this specification includes any characteristic or factor related to the state or condition of the wheel. An example of such a predetermined quantity of state is a tire internal air pressure of a tire of wheel. Further, the phrase "an occurrence of an abnormality of the wheel" is intended to encompasse times when there is a high probability that an abnormality of the wheel has occurred. In addition, the phrase "transmit a notification related to the occurrence of an abnormality of the wheel" is intended to encompasse either or both of (a) times when the notification related to the occurrence of an abnormality of the wheel is transmitted directly, and (b) times when the notification related to the occurrence of an abnormality of the wheel is transmitted indirectly by manipulating the characteristics of the transmission frequency, or the like.

The first aspect may function such that, when the wheel state adjustment device is adjusting the predetermined quantity of state of the wheel, the wheel state monitoring device reduces the transmission frequency at which the notification related to the occurrence of an abnormality of the wheel is transmitted by stopping transmission of the notification related to the occurrence of an abnormality of the wheel. By adopting this configuration, the transmission of the notification related to the abnormality of the wheel is stopped, thus enabling energy saving to be achieved by reducing the amount of energy that is consumed by transmitting the notification related to the occurrence of an abnormality of wheel.

Further, the first aspect may function such that, when the wheel state adjustment device is adjusting the predetermined quantity of state of the wheel, the wheel state monitoring device reduces the transmission frequency at which the notification related to the occurrence of an abnormality of the wheel is transmitted by changing a determination condition for determining whether an abnormality of the wheel has occurred. It should be noted that, in a normal case, there are occasions when adjustment of a predetermined quantity of state by a wheel state adjustment device causes a wheel state monitoring device to mistakenly determine that an abnormality of a wheel has occurred, even though no such abnormality of the wheel actually exists. However, according to the present wheel state adjustment system, it is possible to effectively inhibit such mistaken determinations from being made, by appropriately changing the determination condition for the occurrence of an abnormality of the wheel.

The first aspect may also function such that the wheel state adjustment device notifies the wheel state monitoring device that the wheel state adjustment device is adjusting the predetermined quantity of state of the wheel by manipulating the predetermined quantity of state of the wheel in a predetermined manner. By adopting such a configuration, it is possible to notify the wheel state monitoring device that the wheel state adjustment device is adjusting the predetermined quantity of state of the wheel by using a simple method, namely, by manipulating the predetermined quantity of state of the wheel using the wheel state adjustment device.

According to a modified form of the first aspect, the wheel state adjustment device notifies the wheel state monitoring device that the predetermined quantity of state of the wheel is being adjusted by manipulating the predetermined quantity of state such that the predetermined quantity of state exhibits a type of behavior that is not normal. If this configuration is utilized, it is possible to clearly distinguish between (i) the behavior of the predetermined quantity of state of the wheel at normal times, and (ii) a specific type of behavior of the predetermined quantity of state of the wheel that is caused by adjustment of the predetermined quantity of state of the wheel. As a result of this clear distinction, it is possible to inhibit the two types of behavior from being confused with each other. Note that, the phrase "a type of behavior that is not normal" is intended to encompasse a type of behavior that is, for example, not normally exhibited when the wheel is being used and run in everyday conditions. Further, this "type of behavior that is not normal" is distinguishable from behavior of the predetermined quantity of state of the wheel that is exhibited as a result of damage of the wheel or its running environment.

Moreover, the first aspect may function such that the wheel state adjustment device adjusts the predetermined quantity of state of the wheel by referring to a monitoring result for the predetermined quantity of state of the wheel that is obtained from the wheel state monitoring device. By adopting such a configuration, it is possible to perform the adjustment of the predetermined quantity of state of the wheel in line with changes in the predetermined quantity of state of the wheel.

In addition, the first aspect may function such that the wheel state adjustment device adjusts the predetermined quantity of state of the wheel by referring to a speed of a vehicle to which the wheel is attached. Adoption of this configuration enables the predetermined quantity of state of the wheel to be adjusted safely in line with the vehicle speed.

Moreover, according to the first aspect, the predetermined quantity of state of the wheel may be a tire internal air pressure of a tire of the wheel. The tires of an automobile are in contact with the road surface, and are easily damaged or affected by the environment. Therefore, it is desirable to maintain the tire internal air pressure at an appropriate level. The present wheel state adjustment system takes this requirement into consideration, and makes it is possible to appropriately monitor and adjust the tire internal air pressure.

The first aspect of the invention may also be provided with a warning device that generates a warning based on the notification related to the occurrence of an abnormality of the wheel that is obtained from the wheel state monitoring device. Utilization of this configuration makes it possible to easily inform the driver or other vehicle user about the occurrence of an abnormality of the wheel by generating the warning related to the occurrence of the abnormality of the wheel.

It should be noted that the scope of the invention is intended to include other suitable combinations of the above described elements, other modifications thereof, and any other systems or devices that, despite different wording or phraseology, realize the invention. All such combinations, modifications, devices and systems are intended to fall within the scope of the invention receiving patent protection under the present application.

According to some aspects of the invention, it is possible to both monitor the predetermined quantity of state of the wheel using the wheel state monitoring device and adjust the predetermined quantity of state of the wheel using the wheel state adjustment device while the transmission frequency of the notification related to the occurrence of an abnormality of the wheel is reduced when the predetermined quantity of state of the wheel is being adjusted by the wheel state adjustment device. Accordingly, it is possible to reduce the amount of energy that is consumed by transmitting the notification related to the occurrence of an abnormality of the wheel.

A second aspect of the invention provides a wheel state adjustment method for a wheel state adjustment system. This method includes the steps of: monitoring a predetermined quantity of state of a wheel and transmitting a notification when an abnormality of the wheel occurs; and adjusting the predetermined quantity of state of the wheel, and reducing a transmission frequency at which the notification related to the occurrence of an abnormality of the wheel is transmitted when the predetermined quantity of state of the wheel is being adjusted.

The second aspect may function such that, when the predetermined quantity of state of the wheel is being adjusted, the transmission frequency at which the notification related to the occurrence of an abnormality of the wheel is transmitted is reduced by stopping transmission of the notification related to the occurrence of an abnormality of the wheel.

Moreover, the second aspect may function such that when the predetermined quantity of state of the wheel is being adjusted, the transmission frequency at which the notification related to the occurrence of an abnormality of the wheel is transmitted is reduced by changing a determination condition for determining whether an abnormality of the wheel has occurred.

Further, the second aspect may function such that the monitoring step monitors whether the predetermined quantity of state of the wheel is being adjusted based on whether the predetermined quantity of state is manipulated in a predetermined manner.

According to a modified form of the second aspect, the monitoring step monitors whether the predetermined quantity of state of the wheel is being adjusted based on whether the predetermined quantity of state of the wheel is changed such that the predetermined quantity of state exhibits a type of behavior that is not normal.

The second aspect may also function such that the adjusting step of the predetermined quantity of state of the wheel is performed by referring to a monitoring result for the predetermined quantity of state of the wheel.

In addition, the second aspect may function such that the adjusting step of the predetermined quantity of state of the wheel is performed by referring to a speed of a vehicle to which the wheel is attached.

Moreover, the second aspect may function such that the monitoring step of the predetermined quantity of state of the wheel is based upon measurement of a tire internal air pressure of a tire of the wheel.

Further, the wheel state adjustment method of the second aspect may further include a step of generating a warning based on the notification related to the occurrence of an abnormality of the wheel.

A third aspect of the invention provides a wheel state adjustment system comprising: a wheel state monitoring means for monitoring a predetermined quantity of state of a wheel, and for transmitting a notification when an abnormality of the wheel occurs; and a wheel state adjustment means for adjusting the quantity of state of the wheel. In the third aspect, the wheel state monitoring means reduces a transmission frequency at which the notification related to the occurrence of an abnormality of the wheel is transmitted when the wheel state adjustment means is adjusting the predetermined quantity of state of the wheel.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Hereinafter, preferred, exemplary embodiments of the invention will be described with reference to the drawings.

First Embodiment

Figure 1:
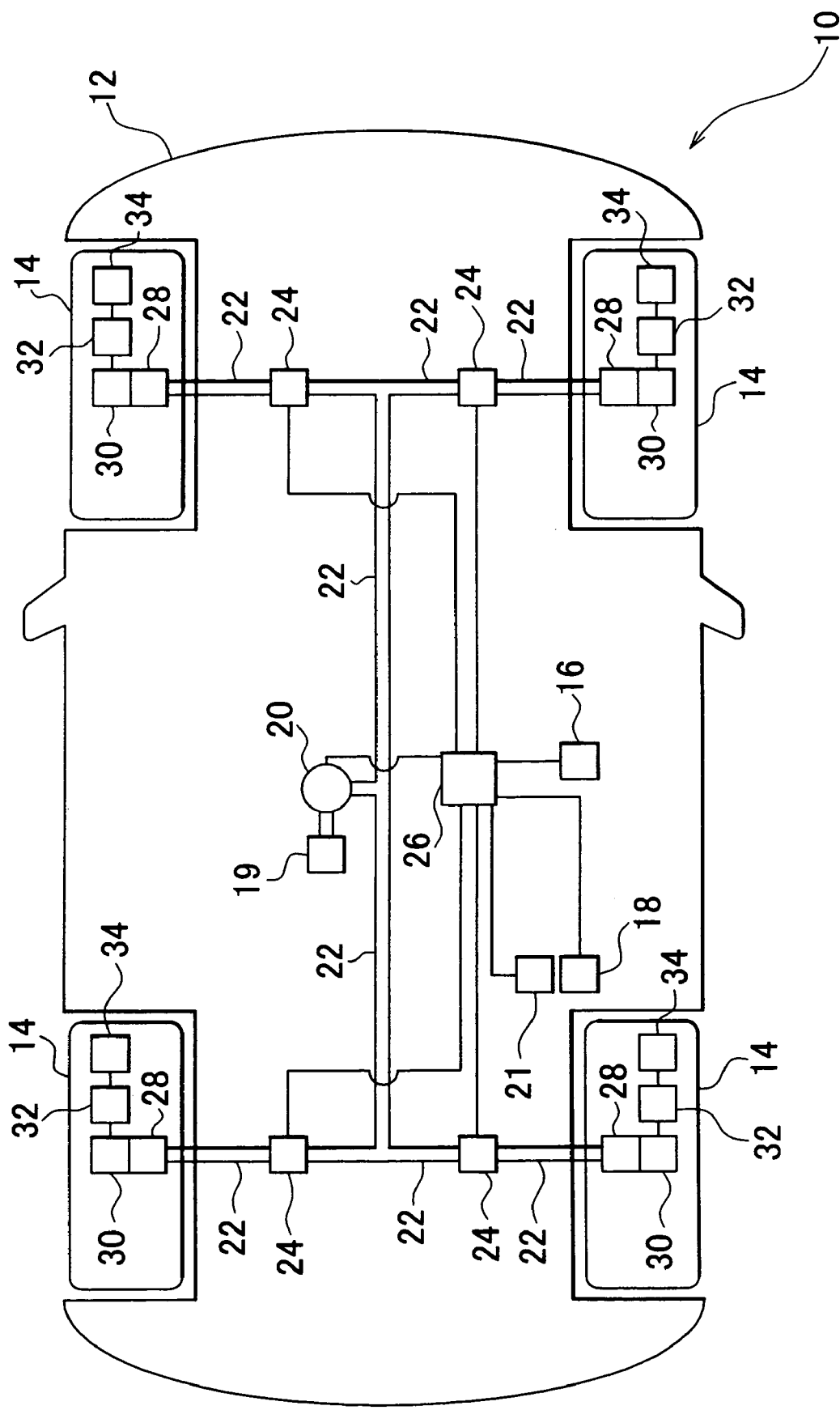
FIG. 1 shows the overall configuration of a vehicle according to a first embodiment.

FIG. 1 shows the overall configuration of a vehicle 10 according to the first embodiment. This vehicle 10 is provided with a mechanism for monitoring a tire internal air pressure of each tire (not shown), and a mechanism for adjusting each tire internal air pressure. The vehicle 10 includes a vehicle body 12, and wheels 14 that are provided at the left and right sides of the front and rear of the vehicle body 12.

A vehicle body side communication device 16; a warning device 18; an air tank 19; an air pump 20 that is connected to the air tank 19; a tire air pressure indicator 21; four air adjustment electromagnetic valves 24 that are connected to the air pump 20 via an air passage 22; and an Electronic Control Unit (ECU) 26 are mounted in the vehicle body 12. The ECU 26 is connected to the vehicle body side communication device 16, the warning device 18, the tire air pressure indicator 21, the air pump 20, and the four air adjustment electromagnetic valves 24. Note that, for the sake of explanatory simplicity, the following description will focus on the example of one of the wheels 14, although the same explanation applies to all four wheels 14.

The wheel 14 includes the tire that is filled with air, and a wheel body (not specifically shown) that supports the tire. The wheel 14 is provided with a tire pressure adjustment portion 28 that is connected via the air passage 22 to the air adjustment electromagnetic valve 24; a pressure detection sensor 30; a transmission mode determination device 32 that is connected to the pressure detection sensor 30; and a wheel side communication device 34 that is connected to the transmission mode determination device 32. The pressure detection sensor 30, the transmission mode determination device 32, and the wheel side communication device 34 operate using electric energy stored in a battery (not shown) mounted in the wheel 14. The pressure detection sensor 30, the transmission mode determination device 32, and the wheel side communication device 34 that are provided in the wheel 14 may be formed as an integral unit or as separate units.

The tire pressure adjustment portion 28 functions as a valve connecting the inside of the tire with the air passage 22, and (a) fills the tire with air provided from the air adjustment electromagnetic valve 24, and (b) transmits the air within the tire to the air adjustment electromagnetic valve 24. The tire pressure adjustment portion 28 adjusts the air pressure within the air passage 22 and the air pressure within the tire so that the two air pressures are substantially equal to each other.

The pressure detection sensor 30 is configured as a Tire Pressure Monitoring System (TPMS) that can individually monitor the tire internal air pressure of the tire. The pressure detection sensor 30 periodically detects the tire internal air pressure, and transmits the obtained detection results to the transmission mode determination device 32. The pressure detection sensor 30 according to this exemplary embodiment detects the tire internal air pressure, and transmits the obtained detection result to the transmission mode determination device 32 at a rate of once every fifteen seconds.

The transmission mode determination device 32 determines a transmission mode of the wheel side communication device 34 based on the detection result received from the pressure detection sensor 30. More specifically, the transmission mode determination device 32 determines the transmission mode of the wheel side communication device 34 by comparing (i) a change amount for a predetermined time period of the tire internal air pressure, and (ii) a pre-set transmission mode determination threshold value. The above mentioned change amount is derived from the detection result from the pressure detection sensor 30.

In this embodiment, the wheel side communication device 34 has two transmission modes, namely, (i) a normal transmission mode in which the detection result of the pressure detection sensor 30 is transmitted infrequently at a rate of once every minute, and (ii) an emergency transmission mode in which the detection result of the pressure detection sensor 30 is transmitted frequently at a rate of once every fifteen seconds. When the change amount for the predetermined time of the internal air pressure is a value that is equal to or less than the transmission mode determination threshold value, it is determined that the internal air pressure of the tire is normal. Accordingly, the transmission mode determination device 32 determines that the normal transmission mode should be used as the transmission mode. On the other hand, when the change amount for the predetermined time of the internal air pressure is a value that is more than the transmission mode determination threshold value, it is determined that there is a possibility that the internal air pressure of the tire is abnormal. As a result, the transmission mode determination device 32 determines that the abnormal transmission mode should be used as the transmission mode.

In the case that the tire internal air pressure is pro-actively adjusted to suit a running environment in line with a command from a vehicle driver, or other vehicle user (as will be described later), when the air adjustment electromagnetic valves 24, etc., are adjusting the tire internal air pressure, the transmission mode determination device 32 will have a tendency to control the transmission frequency at which the wheel side communication device 34 transmits the detection results from the pressure detection sensor 30, and the like, to be less than that at normal times. Accordingly, the transmission mode determination device 32 of this embodiment reduces the transmission frequency of the wheel side communication device 34 by changing the transmission mode determination threshold value (which is the condition for determining whether an abnormality of the wheel 14 has occurred), when the air adjustment electromagnetic valves 24, etc., are adjusting the tire internal air pressure to suit the running environment.

More particularly, when the transmission mode determination device 32 determines that the tire internal air pressure is not being adjusted, the transmission mode is determined using a first transmission mode determination threshold value. On the other hand, when it is determined that the tire internal air pressure is being adjusted, the transmission mode is determined using a second transmission mode determination threshold value that is higher than the first transmission mode determination value. When the second transmission mode determination threshold value is used, as compared to when the first transmission mode determination threshold value is used, the frequency of switching to the emergency transmission mode from the normal transmission mode is reduced due to the higher threshold value. As a result, it is possible to reduce the overall transmission frequency of the wheel side communication device 34.

The transmission mode determination device 32 is configured such that the first transmission mode determination threshold value is returned to after a predetermined time has elapsed after use of the second transmission mode determination threshold value. It is preferable if this predetermined time is set such that the second transmission mode determination threshold value is utilized by the transmission mode determination device 32 when the air adjustment electromagnetic valve 24, etc. are adjusting the tire internal air pressure to suit the running environment.

The transmission mode determination device 32 determines whether or not the air adjustment electromagnetic valve 24, etc. are adjusting the tire internal air pressure to suit the running environment based on the detection result of the pressure detection sensor 30. In this embodiment, as will be described hereinafter, an "indication signal" that the tire internal air pressure is being adjusted by the air adjustment electromagnetic valves 24, etc., to suit the running environment is sent to the devices on the wheel 14 side from the devices on the vehicle body 12 in the form of a specific type of behavior of the tire internal air pressure. Accordingly, the transmission mode determination device 32 determines that the tire internal air pressure is exhibiting the specific type of behavior based on detection result of the pressure detection sensor 30, and determines that either the first or the second transmission mode determination threshold value should be utilized as the transmission mode determination threshold value.

The transmission mode determination device 32 transmits information specifying the determined transmission mode to the wheel side communication device 34. In addition, other information also is sent to the wheel side communication device 34, such as (a) the detection result of the pressure detection sensor 30, and (b) whether the above indication signal that the internal air pressure of the tire is being adjusted has been received or not.

The wheel side communication device 34 then wirelessly transmits the detection result from the pressure detection sensor 30 to the vehicle body side communication device 16 using the transmission mode determined by the transmission mode determination device 32. At this time, the wheel side communication device 34 may also include information in the transmission radio waves that is related to, in addition to the detection result of the pressure detection sensor 30, the transmission mode, and whether the operating mode of the air adjustment electromagnetic valves 24 has been confirmed based on the tire internal air pressure. This information is indicated in the form of binary digits.

The vehicle body side communication device 16 mounted in the vehicle body 12 receives the radio waves transmitted wirelessly from the wheel side communication device 34, and the like, and transfers the information included in the radio waves to the ECU 26.

The warning device 18 is controlled by the ECU 26 and emits an alarm based on a notification related to the occurrence of an abnormality of the wheel 14 which is received from pressure detection sensor 30 of each wheel 14 via the wheel side communication device 34 and the transmission mode determination device 32.

The tire air pressure indicator 21 transmits a command related to the running environment, which is received from the driver or other vehicle user, to the ECU 26, when it is necessary to ensure a comfortable ride by pro-actively changing the tire internal air pressure to suit the running environment. This command is transmitted to the ECU 26 via the tire air pressure indicator 21, when, for example, the driver is driving at high speed along a paved road surface such as a high speed road, or driving on a wet road surface such as muddy road, and wishes to notify the ECU 26 of the running environment.

The air tank 19 holds compressed air at a predetermined pressure, and the air pump 20 feeds the air held in the air tank 19 to the air adjustment electromagnetic valve 24 via the air passage 22.

The air adjustment electromagnetic valves 24 are provided at positions that correspond to the respective wheels 14, and are electromagnetic valves that adjust the tire internal air pressure of the corresponding wheel 14. More particularly, each air adjustment electromagnetic valve 24 increases the tire internal air pressure by feeding air received from the air pump 20 into the tire via the tire pressure adjustment portion 28 of the corresponding wheel 14. On the other hand, each air adjustment electromagnetic valve 24 decreases the tire internal air pressure by bleeding air from the tire via the tire pressure adjustment portion 28 and discharging it to the outside of the vehicle 10.

The air pump 20 and the air adjustment electromagnetic valves 24 are controlled by the ECU 26, and adjust the tire internal air pressure by referring to the monitoring result for the tire internal air pressure obtained by the pressure detection sensor 30. Information related to the history of increases and decreases of the tire internal air pressure that has been performed by the air pump 20 and the air adjustment electromagnetic valves 24 also can be stored in the ECU 26.

The ECU 26 controls various states of the vehicle 10 by controlling the air pump 20, the air adjustment electromagnetic valves 24, the warning device 18, and the various other devices based on information received from the vehicle body side communication device 16, the tire air pressure indicator 21, and other electronic devices, not shown. The ECU 26 of this embodiment has various functions, some of which are shown in FIG. 2.

Figure 2:
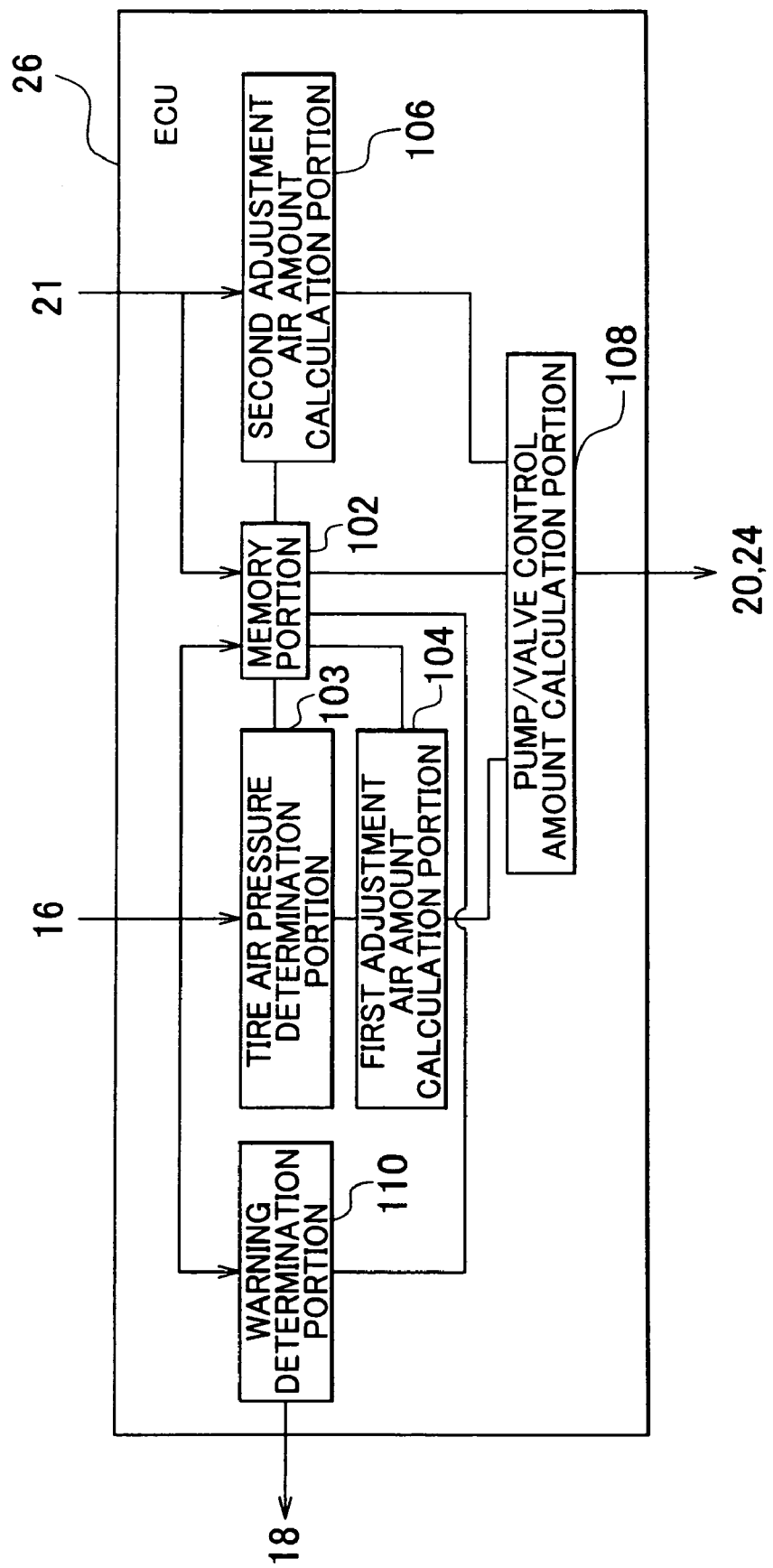
FIG. 2 is a function block diagram showing functions, among various different functions of an ECU, related to monitoring and adjustment of a tire internal air pressure.

FIG. 2 is a function block diagram showing the functions of the ECU 26 that are related to monitoring and adjustment of a tire internal air pressure. The ECU 26 includes a memory portion 102, a tire air pressure determination portion 103, a first adjustment air amount calculation portion 104, a second adjustment air amount calculation portion 106, a pump/valve control amount calculation portion 108, and a warning determination portion 110.

The memory portion 102 stores (a) the detection result of the pressure detection sensor 30 that is received via the wheel side communication device 34 and the vehicle body side communication device 16, and (b) detection times and transmission/reception times for the detection results. The memory portion 102 also stores other information that is received through the wheel side communication device 34 and the vehicle body side communication device 16. In addition, the memory portion 102 stores information related to adjustment, namely, the history of increase and decrease, of the tire internal air pressure that has been performed by controlling drive of the air pump 20 and the air adjustment electromagnetic valve 24. For example, the memory portion 102 stores information related to supplied air amounts and the bled air amounts of each tire.

The tire air pressure determination portion 103 determines whether or not the tire internal air pressure has deviated from a "reference air pressure" based on the detection result from the pressure detection sensor 30 that is received from the vehicle body side communication device 16. The term reference air pressure as used herein is intended to encompasse an air pressure that is determined to be suitable given the make and model of the vehicle 10, and is within a range that can ensure, for example, appropriate running when the vehicle 10 is being driven normally.

The first adjustment air amount calculation portion 104 calculates (i) the supplied air amount to be supplied to the tire, and (ii) the bled air amount to be bled from the tire in order to return the tire internal air pressure to the reference air pressure. This calculation is based on the detection results of the pressure detection sensor 30, and is performed by the first adjustment air amount calculation portion 104 when the tire air pressure determination portion 103 determines that the tire internal air pressure has deviated from the reference air pressure. At this time, the first adjustment air amount calculation portion 104 can refer if necessary to the various types of information that are stored in the memory portion 102. The calculation results for the supplied air amount and the bled air amount to be supplied and bled from the tire are sent to the pump/valve control amount calculation portion 108 from the first adjustment air amount calculation portion 104.

The second adjustment air amount calculation portion 106 calculates the supplied air amount to be supplied to the tire and bled air amount to be bled from the tire in order to change the tire internal air pressure to an air pressure that is suitable for the running environment. This calculation is performed based on an indication signal related to the running environment that is received by the second adjustment air amount calculation portion 106 from the tire air pressure indicator 21. At this time, the second adjustment air amount calculation portion 106 can refer if necessary to the various types of information that are stored in the memory portion 102. The calculation results for the supplied air amount and the bled air amount to be supplied to and bled from the tire are sent to the pump/valve control amount calculation portion 108 from the second adjustment air amount calculation portion 106.

The pump/valve control amount calculation portion 108 calculates an operating mode of the air pump 20 and an adjustment amount of the air adjustment electromagnetic valves 24 based on the calculation results of the first adjustment air amount calculation portion 104 and the second adjustment air amount calculation portion 106. Then, the pump/valve control amount calculation portion 108 transmits a control signal based on the calculated operating mode and adjustment amount of the air pump 20 and the air adjustment electromagnetic valves 24 to the air pump 20 and the corresponding air adjustment electromagnetic valve 24. As a result, the air pump 20 and the air adjustment electromagnetic valve 24 are driven in accordance with the control signal received from the pump/valve control amount calculation portion 108.

Moreover, in the case that the calculation result of the second adjustment air amount calculation portion 106 is utilized, the pump/valve control amount calculation portion 108 calculates the operating mode of the air pump 20 and the adjustment amount of the air adjustment electromagnetic valve 24 such that an indication signal is sent to the pressure detection sensor 30 and the transmission mode determination device 32, etc., provided in the wheel 14 in the form of manipulated changes of the state of the tire internal air pressure. In other words, the pump/valve control amount calculation portion 108 derives the operating mode of the air pump 20 and the adjustment amount of the air adjustment electromagnetic valves 24 such that the indication signal that the tire internal air pressure is being adjusted by the air adjustment electromagnetic valve 24, etc., which takes the form of a change in the tire internal air pressure, is transmitted to the pressure detection sensor 30 and the transmission mode determination device 32 provide on the wheel 14 side from the ECU 26 provided on the vehicle body 12 side.

With this embodiment, when it is necessary to increase the tire internal air pressure based on the calculation result of the second adjustment air amount calculation portion 106, the pump/valve control amount calculation portion 108 transmits a control signal to the air pump 20 and the air adjustment electromagnetic valve 24. This control signal causes the tire internal air pressure to increase after having decreased once. On the other hand, when it is necessary to decrease the tire internal air pressure based on the calculation result of the second adjustment air amount calculation portion 106, the pump/valve control amount calculation portion 108 transmits a control signal to the air pump 20 and the air adjustment electromagnetic valve 24. This control signal causes the tire internal air pressure to decrease after having increased once. As a result, the behavior of tire internal air pressure is caused to change (namely, to increase and then decrease, or to decrease and then increase) during a predetermined time period in a specific type of way that would not occur during normal behavior of the tire internal air pressure. This specific type of behavior of the tire internal air pressure is detected by the pressure detection sensor 30, which in turn transmits this information to the transmission mode determination device 32.

In order that the indication signal that the tire internal air pressure is being adjusted by the air adjustment electromagnetic valve 24, etc. is effectively transmitted to the pressure detection sensor 30, the indication signal is determined so as to take into consideration (a) the detection timing of the pressure detection sensor 30 for the tire internal air pressure, and (b) the determination criteria for the transmission mode of the transmission mode determination device 32. For example, if the sequential behavior of the tire internal air pressure that acts as the indication signal takes place during an extremely short period of time, it is possible that the indication signal will completely start-and-finish within the fifteen second interval between the detections of the pressure detection sensors 30. As a result, it is possible that the pressure detection sensors 30 will not identify the indication signal. Accordingly, the timing and duration of the specific type of behavior of tire internal air pressure that acts as the indication signal are determined such that it is possible for the pressure detection sensor 30 to effectively identify the sequential behavior of the tire internal air pressure that acts as the indication signal while repeating normal detection of the tire internal air pressure a number of times.

Moreover, for example, when it is necessary to have detection results from at least five repetitions of normal detection of the pressure detection sensors 30 in order to identify the sequential behavior of tire internal air pressure that acts as the indication signal, it is possible that the transmission mode will be determined without taking into consideration the indication signal if the transmission mode determination device 32 determines the transmission mode based upon detection results for three detection repetitions of the pressure detection sensors 30. In order to avoid this type of problem, the timing and duration of the specific type of behavior of the tire internal air pressure that acts as the indication signal are determined prior to when the transmission mode determination device 32 determines the transmission mode. By adopting this configuration, the pressure detection sensor 30 is able to identify the sequential behavior of the tire internal air pressure that acts as the indication signal.

The warning determination portion 110 activates the warning device 18 based on whether an abnormality of the wheel 14 has occurred, a fact that is transmitted to the warning determination portion 110 from the pressure detection sensor 30 of the wheel 14 via the transmission mode determination device 32 and the wheel side communication device 34. In this embodiment, it is determined that an abnormality of the wheel 14 has occurred based on an absolute value and a change amount of the tire internal air pressure. When the values of the absolute value and the change amount of the tire internal air pressure are within a normal range, it is determined that there is no abnormality of the wheel 14, and the warning determination portion 110 does not activate the warning device 18. On the other hand, if the values of the absolute value and the change amount of the tire internal air pressure are outside the normal range, it is determined that there is an abnormality of the wheel 14, and the warning determination portion 110 activates the warning device 18. The absolute value and the change amount of the tire internal air pressure are derived from the detection result of the pressure detection sensor 30 that is transmitted from the wheel side communication device 34.

With the above-configured embodiment, the pressure detection sensor 30 monitors whether or not an abnormality related to the tire internal air pressure has occurred. In addition, it is possible to determine whether it is likely that an abnormality related to the tire internal air pressure has occurred based on the absolute value and the change amount of the tire internal air pressure that are derived from the detection result of the pressure detection sensor 30. The detection result of the pressure detection sensor 30 is transmitted to the vehicle body side communication device 16 and the ECU 26 provided on the vehicle 10 side via the transmission mode determination device 32 and the wheel side communication device 34. Accordingly, a wheel state monitoring device or wheel state monitoring means that (i) monitors the tire internal air pressure that is one of the quantities of state of the wheel 14, and (ii) transmits information related to the occurrence of an abnormality of the wheel 14 to the vehicle 10 side is configured from the pressure detection sensor 30, the transmission mode determination device 32 and the wheel side communication device 34. Further, a wheel state adjustment device or a wheel state adjustment means that adjusts the tire internal air pressure is configured from the air pump 20, the tire air pressure indicator 21, the air passage 22, the air adjustment electromagnetic valve 24, and the ECU 26.

Next, the operation of a wheel state adjustment system of the embodiment that is realized by utilization of the above described configuration will be described.

The explanation will begin by focusing on times when the vehicle 10 is running normally.

First, when the vehicle 10 is running normally, the tire internal air pressure is periodically detected by the pressure detection sensor 30, and the detection result thereof is transmitted to the vehicle body side communication device 16 from the wheel side communication device 34 using the transmission mode determined by the transmission mode determination device 32. At this time, in the case that, for example, the tire internal air pressure is changing comparatively slowly due to natural leakage, or the like, the detection result for the tire internal air pressure is transmitted to the vehicle body side communication device 16 from the wheel side communication device 34 using the normal communication mode. Alternatively, for example, if the tire internal air pressure changes suddenly due to a puncture or the like, the detection result for the tire internal air pressure is transmitted to the vehicle body side communication device 16 from the wheel side communication device 34 using the emergency communication mode.

The information that is received in radio wave form by the vehicle body side communication device 16, such as the detection result of the pressure detection sensor 30, is transmitted to the ECU 26. The ECU 26 stores the information such as the detection result of the pressure detection sensor 30 received from the vehicle body side communication device 16 in the memory portion 102, and uses the tire air pressure determination portion 103 to determine whether the tire internal air pressure has deviated from a reference state. If it is determined that the tire internal air pressure has not deviated from the reference state, monitoring of the tire internal air pressure continues.

On the other hand, if it is determined that the tire internal air pressure has deviated from the reference state, the first adjustment air amount calculation portion 104 calculates the necessary supplied air amount or bled air amount that needs to be supplied to or bled from the tire in order to return the tire internal air pressure to the reference state. Then, the pump/valve control amount calculation portion 108 uses the calculated supplied air amount or bled air amount to be supplied to or bled from the tire to calculate the operating mode of the air pump 20 and the adjustment amount of the air adjustment electromagnetic valve 24. A control signal based on the calculation results is then transmitted from the pump/valve control amount calculation portion 108 to the air pump 20 and the air adjustment electromagnetic valve 24. Accordingly, adjustment is performed such that the tire internal air pressure is maintained in the reference state as a result of the tire internal air amount being adjusted by the air pump 20 and the air adjustment electromagnetic valve 24.

Figure 3:
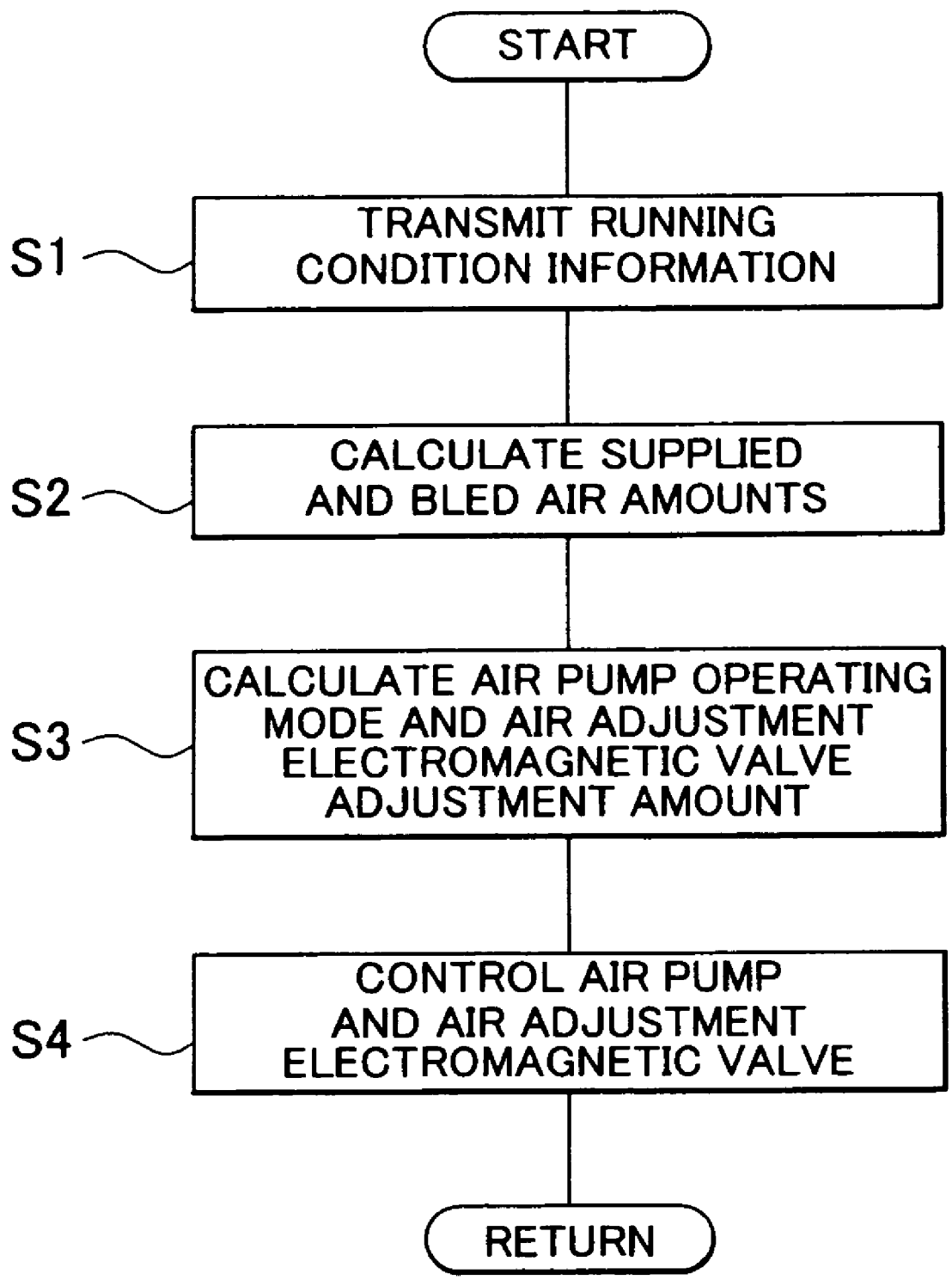
FIG. 3 is a flow chart showing a processing routine in which the tire internal air pressure is adjusted to suit a running environment of the vehicle, and more particularly showing the processing performed by devices provided on a vehicle body.
Figure 4:
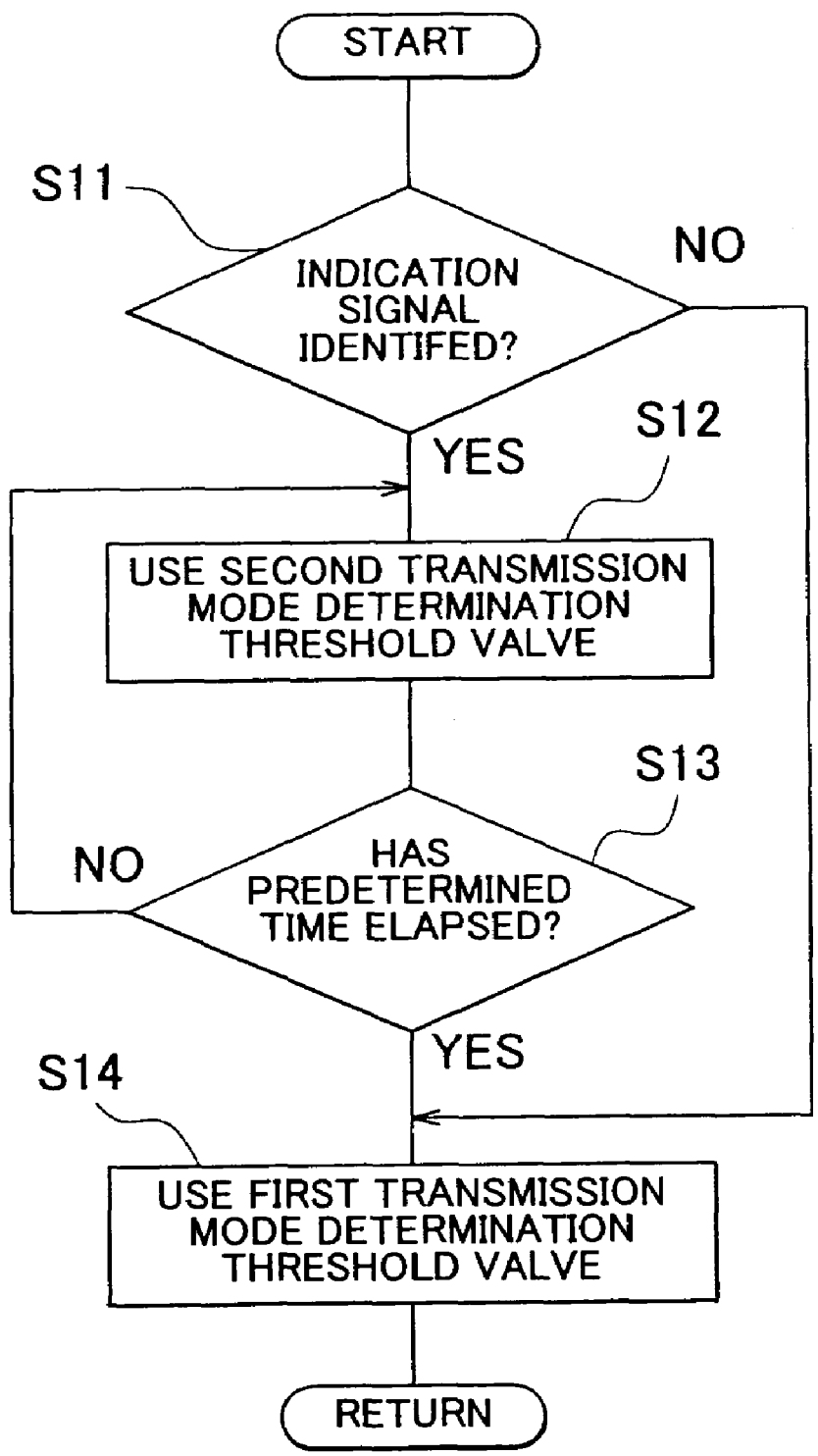
FIG. 4 is a flow chart showing a processing routine in which the tire internal air pressure is adjusted to suit the running environment of the vehicle, and more particularly showing the processing performed by devices provided on the wheel.

Next, FIGS. 3 and 4 will be used to explain a case when the tire internal air pressure is adjusted to suit the running environment of the vehicle 10. FIGS. 3 and 4 are flow charts showing a processing routine in which the tire internal air pressure is adjusted to suit the running environment of the vehicle. More particularly, FIG. 3 shows the processing performed by devices provided predominantly on the vehicle body 12 side, and FIG. 4 shows the processing performed by devices provided predominantly on the wheel 14 side.

First, information related to the running environment of the vehicle 10 is transmitted to the ECU 26 from the vehicle driver or other vehicle user via the tire air pressure indicator 21 (step S1 of FIG. 3). Then, the second adjustment air amount calculation portion 106 of the ECU 26 calculates the supplied air amount and the bled air amount that need to be supplied to or bled from the tire in order to change the tire internal air pressure to an air pressure that is suitable for the running environment of the vehicle 10 (step S2).

Next, the pump/valve control amount calculation portion 108 uses the calculation results for the supplied air amount or bled air amount to be supplied to or bled from the tire to calculate the operating mode of the air pump 20 and the adjustment amount of the air adjustment electromagnetic valve 24. A control signal based on the calculation results is then transmitted from the pump/valve control amount calculation portion 108 to the air pump 20 and the air adjustment electromagnetic valve 24 (step S3). Accordingly, the air pump 20 and the air adjustment electromagnetic valve 24 are controlled and driven to adjust the tire internal air amount based on the received control signal. Thus, the air pump 20 and the air adjustment electromagnetic valve 24 adjust the tire internal air pressure so that it becomes an air pressure that suits the running environment of the vehicle 10 (step S4).

At this time, the air pump 20 and the air adjustment electromagnetic valve 24 adjust the tire internal air pressure based on the control signal from the pump/valve control amount calculation portion 108 of the ECU 26. Accordingly, the indication signal that the tire internal air pressure is being adjusted is transmitted to the pressure detection sensor 30 and the transmission mode determination device 32 through the tire internal air pressure. For example, in the case that it is necessary to set the tire internal air pressure to a slightly higher level to suit the running environment, the tire internal air pressure is increased after having been decreased once. Similarly, in the case that it is necessary to set the tire internal air pressure to be slightly lower, the tire internal air pressure is decreased after having been increased once.

This specific type of behavior of the tire internal air pressure is detected by the pressure detection sensor 30, and the transmission mode determination device 32 determines whether the indication signal has been identified or not (step 11 of FIG. 4). When the indication signal is identified by the transmission mode determination device 32 (YES in step S11), it is determined that the tire internal air pressure is being adjusted by the air adjustment electromagnetic valve 24 etc., and thus the second transmission mode determination threshold value is set (step S12). As a result, the transmission frequency of transmissions from the wheel side communication device 34 to the vehicle body side communication device 16 is reduced. When the second transmission mode determination threshold value is being used (step S12), the transmission mode determination device 32 determines whether the predetermined time has elapsed since use of the second transmission mode determination threshold value first started (step S13). In the case that the predetermined time has not elapsed (NO in step S13), the transmission mode determination device 32 continues to utilize the second transmission mode determination threshold value. However, on the other hand, when the predetermined time has elapsed (YES in step S13), it is determined that the adjustment of the tire internal air pressure by the air adjustment electromagnetic valve 24 etc. has been completed, and thus the first transmission mode determination threshold value is set as the transmission mode determination threshold value (step S14).

If the above described indication signal is not identified by the transmission mode determination device 32 (NO in step S11), it is determined that the tire internal air pressure is not being adjusted by the air adjustment electromagnetic valve 24 etc., and thus the transmission mode determination device 32 uses the first transmission mode determination threshold value (step S14).

If it is likely that an abnormality related to the tire internal air pressure has occurred due to a puncture or the like, the warning determination portion 110 of the ECU 26 activates the warning device 18 based on reference to the detection result of the pressure detection sensor 30 that is received from the wheel side communication device 34 and the vehicle body side communication device 16. The warning device 18 issues a warning to the driver or other vehicle users using an alarm, a warning lamp or the like, so as to give notification that there is an abnormality related to the tire internal air pressure.

According to the above described embodiment, when the tire internal air pressure is pro-actively adjusted to suit the running environment, the second transmission mode determination threshold value is utilized while the tire internal air pressure is being adjusted by the air adjustment electromagnetic valve 24 etc. As a result, it becomes more difficult for the transmission mode of the wheel side communication device 34 to be switched to the emergency transmission mode from the normal transmission mode. Accordingly, for example, regardless of whether an abnormality of the tire has occurred or not, it is possible to reduce the likelihood that changes of the tire internal air pressure caused by adjustment of the tire internal air pressure will be mistakenly determined to be the occurrence of an abnormality of the tire. Thus, it is possible to inhibit mistaken determination notifications related to the occurrence of an abnormality of the wheel 14 from being transmitted from the wheel side communication device 34 to the vehicle body side communication device 16. Moreover, it is also possible to maintain the transmission frequency of the wheel side communication device 34 at an appropriate level, and reduce the transmission frequency at which notifications related to the occurrence of an abnormality of the tire internal air pressure are transmitted. By reducing the transmission frequency from the wheel side communication device 34 in this way, it is possible to reduce the amount of power that is consumed by transmissions of the wheel side communication device 34, whereby longer life of the battery can be promoted.

Further, because the indication signal that the tire internal air pressure is being adjusted is transmitted from the devices on the vehicle body 12 side to the devices on the wheel 14 side based on the specific type of behavior of the tire internal air pressure, it is not necessary to provide a special device to transmit such an indication signal. More particularly, by utilizing the specific type of non-normal behavior exhibited by the tire internal air pressure as the indication signal of this type, it is possible to clearly distinguish (a) air pressure changes caused by adjustment of the tire internal air pressure by the air adjustment electromagnetic valve 24 etc. from (b) internal air pressure changes brought about by damage of the tire, the running environment, or the like. Accordingly, it is possible to inhibit the occurrence of mistaken detection related to the indication signal.

In addition, according to this embodiment, adjustment of the tire internal air pressure is performed by referring to the monitoring result from the pressure detection sensor 30 for the tire internal air pressure. Accordingly, it is possible to accurately detect technical problems that are caused by damage like a puncture, or the running environment.

The explanation of the above described embodiment describes a case when the transmission frequency of the notification related to the occurrence of an abnormality of the wheel 14 is reduced when pro-actively adjusting the tire internal air pressure to suit the running environment. However, the invention is not limited to use in this circumstance. For example, even when the tire internal air pressure is adjusted by the air adjustment electromagnetic valve 24 based on the detection result from the pressure detection sensor 30 in order to maintain the tire internal air pressure in the reference state, it is possible to reduce the transmission frequency at which the wheel side communication device 34 etc. transmits the notification related to the occurrence of an abnormality of the wheel 14 in a similar manner to that described above.

Second Embodiment

In the following description of the second embodiment, structural elements that are the same as those of the first embodiment will be denoted with the same reference numerals, and a detailed explanation thereof will be omitted.

Figure 5:
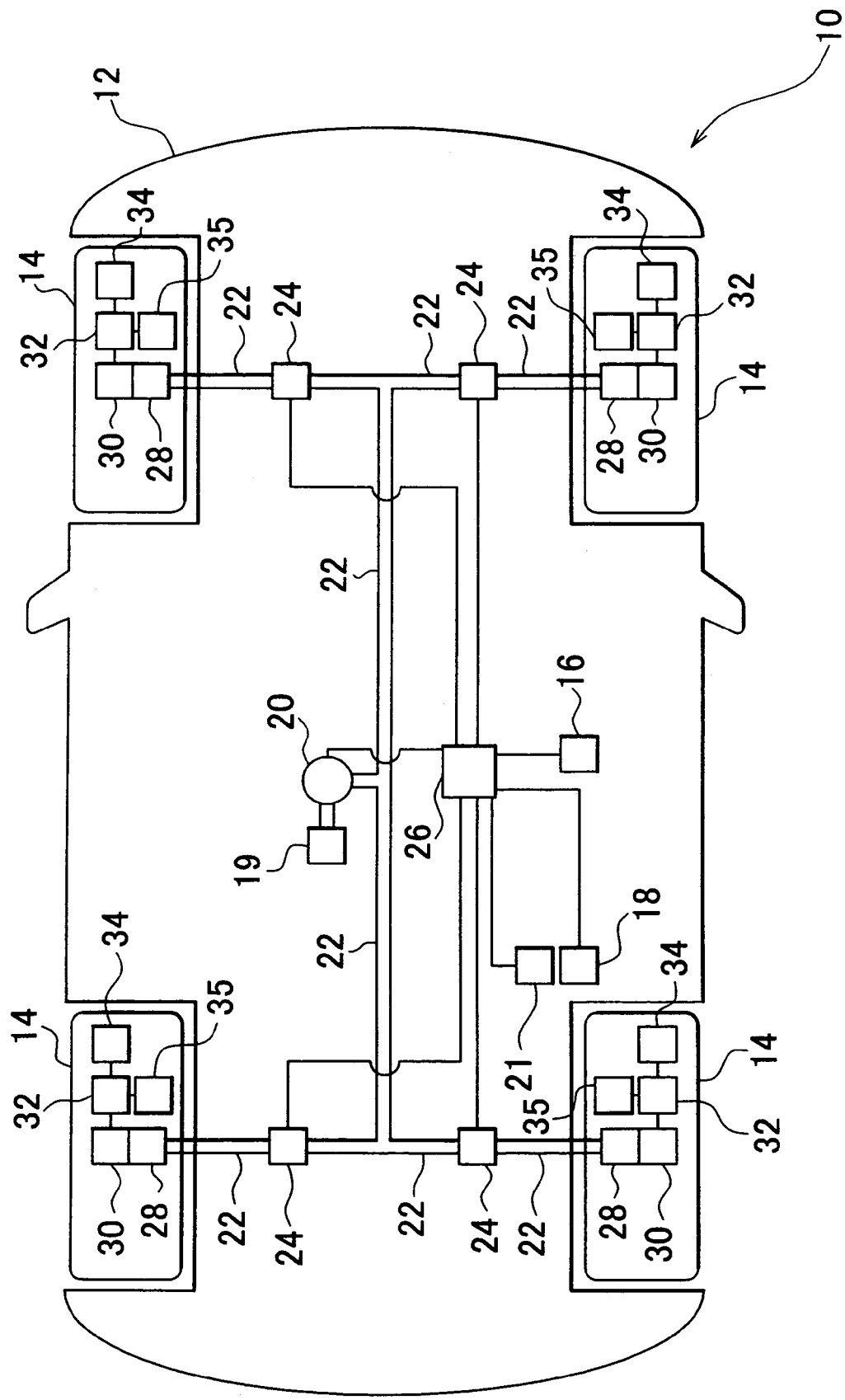
FIG. 5 shows the overall configuration of a vehicle according to a second embodiment.

FIG. 5 shows the overall configuration of the vehicle 10 according to the second embodiment. In this embodiment, vehicle speed detection sensors 35 for detecting the speed of the vehicle 10 are mounted on each wheel 14. The vehicle speed detection sensor 35 may be configured, as chosen, to either directly or indirectly detect the speed of the vehicle 10. For example, the vehicle speed detection sensor 35 may be configured to detect the speed of the vehicle 10 indirectly based on detection results of sensors that detect the rotational speeds of the respective wheels 14. The vehicle speed detection sensor 35 is connected to the transmission mode determination device 32 and transmits its detection results thereto.

The transmission mode determination device 32 has a G-switch (not shown) that is turned to ON and OFF in accordance with a value for the vehicle speed transmitted from the vehicle speed detection sensor 35. More specifically, the G-switch is switched to ON when the vehicle speed detection sensor 35 detects that the vehicle speed is equal to or above a predetermined speed, and is switched to OFF when the vehicle speed is less than the predetermined speed. When the G-switch is switched to ON, the transmission mode determination device 32 determines the transmission mode in a similar manner to the above described first embodiment. On the other hand, when the G-switch is switched to OFF, the transmission mode determination device 32 always determines the normal transmission mode as the transmission mode, regardless of the detection result from the pressure detection sensor 30.

The above mentioned predetermined speed acts as (i) a reference for switching the G-switch to ON and OFF, and (ii) a reference for whether the transmission mode of the wheel side communication device 34 is set and fixed as the normal transmission mode. Further, as will be described hereinafter, the predetermined speed also acts as a determination criterion for determining whether to permit or prevent the pro-active adjustment of the tire internal air pressure. Accordingly, this predetermined speed is set while bearing in mind the range of speeds at which no technical problems occur even if the transmission mode is set and fixed as the normal transmission mode or the pro-active adjustment of the tire internal air pressure is permitted. In this embodiment, the predetermined speed is set at a low speed at which comparatively few technical problems occur.

The wheel side communication device 34 transmits the detection result of the pressure detection sensor 30 and the like to the vehicle body side communication device 16 using the transmission mode determined by the transmission mode determination device 32. According to this embodiment, adjustment permission-prohibition information that indicates whether the pro-active adjustment of the tire internal air pressure is permitted or prohibited is also transmitted from the wheel side communication device 34 to the vehicle body side communication device 16. When the G-switch is switched to ON, the radio waves transmitted from the wheel side communication device 34 include permission-prohibition information that indicates that the pro-active adjustment of the tire internal air pressure is prohibited. On the other hand, when the G-switch is switched to OFF, the radio waves transmitted from the wheel side communication device 34 include permission-prohibition information that indicates that the pro-active adjustment of the tire internal air pressure is permitted.

The radio waves transmitted from the wheel side communication device 34 to the vehicle body side communication device 16 include the adjustment permission-prohibition information in addition to the detection results from the pressure detection sensor 30. The various types of information included in the radio waves that are received by the vehicle body side communication device 16 are then transmitted to the ECU 26, and stored in the memory portion 102 thereof.

Figure 6:
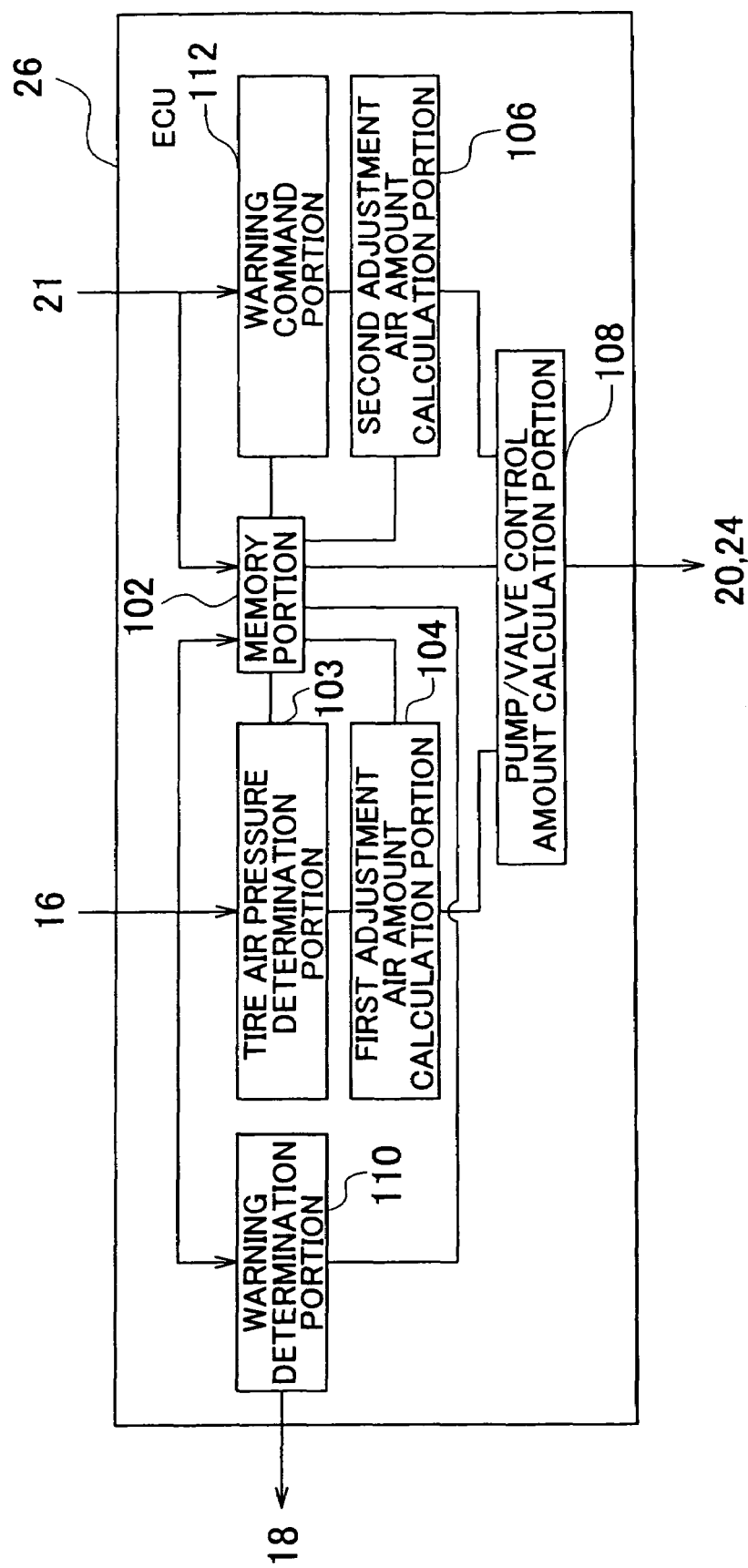
FIG. 6 is a function block diagram showing functions, among various different functions of an ECU according to the second embodiment, related to monitoring and adjustment of a tire internal air pressure.

FIG. 6 is a function block diagram showing the functions, among the various different functions of the ECU 26 according to the second embodiment, related to monitoring and adjustment of the tire internal air pressure. The ECU 26, in addition to the structural elements of the first embodiment, is also provided with a command determination portion 112 that is connected to the memory portion 102 and the second adjustment air amount calculation portion 106. The command signal related to the running environment that is received from the tire air pressure indicator 21 is transmitted to this command determination portion 112.

When the command signal related to the running environment is received from the tire air pressure indicator 21, the command determination portion 112 confirms whether pro-active adjustment of the tire internal air pressure is permitted or not by referring to the adjustment permission-prohibition information that is stored in the memory portion 102. If adjustment of the tire internal air pressure is prohibited, pro-active adjustment of the tire internal air pressure is not performed. The driver or other vehicle user is informed of this fact when necessary. On the other hand, if adjustment of the tire internal air pressure is permitted, the pro-active adjustment of the tire internal air pressure is performed, and the information related to the running environment received from the tire air pressure indicator 21 is transmitted to the second adjustment air amount calculation portion 106 from the command determination portion 112.

The other structural elements of the second embodiment are the same as those of the first embodiment shown in FIGS. 1 to 4.

Figure 7:
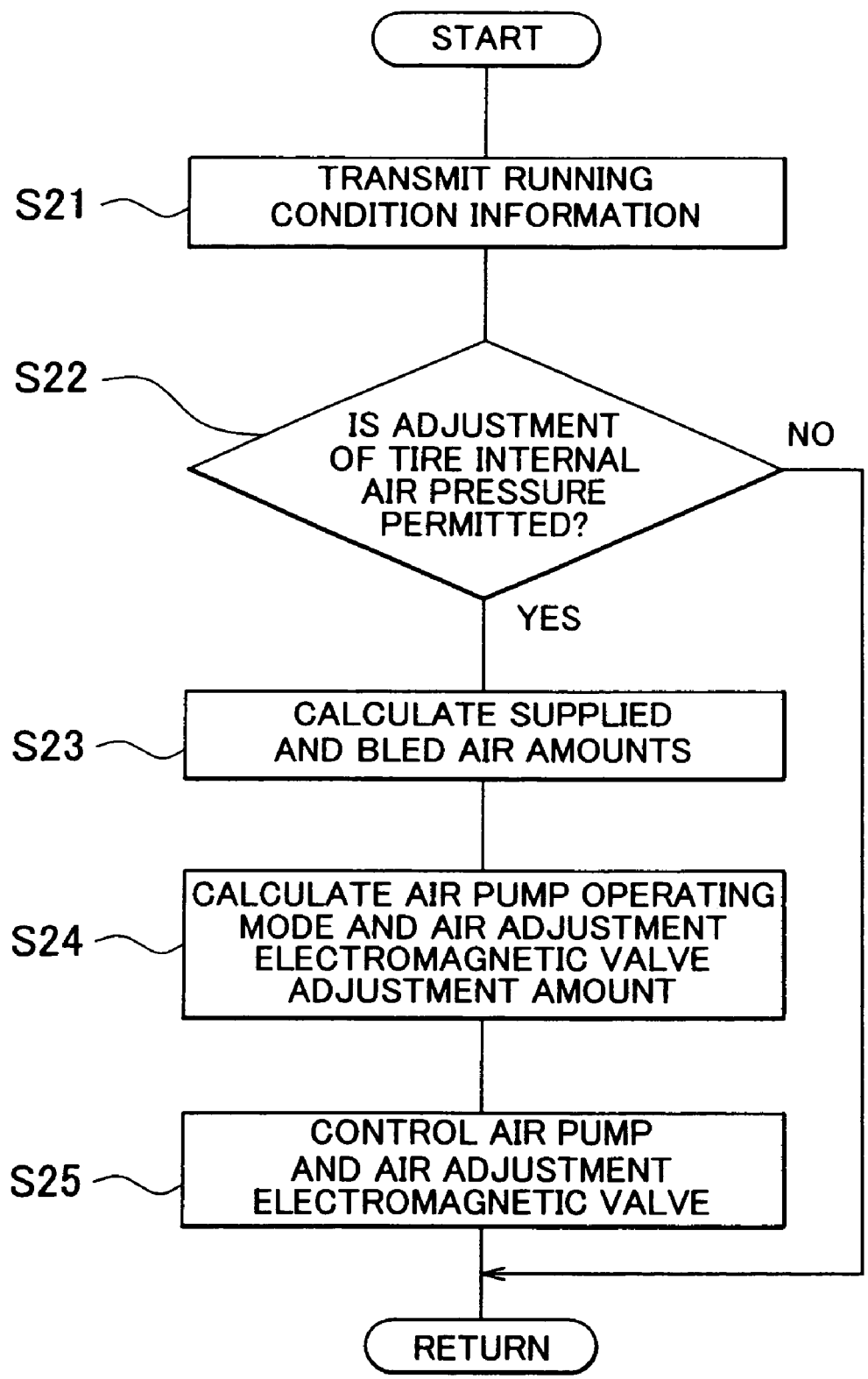
FIG. 7 is a flow chart showing a processing routine in which the tire internal air pressure is adjusted to suit a running environment of the vehicle.

Next, FIG. 7 will be used to explain how the tire internal air pressure is adjusted to suit the running environment of the vehicle 10. FIG. 7 is a flow chart showing a processing routine in which the tire internal air pressure is adjusted to suit a running environment of the vehicle 10.

First, the driver or vehicle user notifies the command determination portion 112 of the ECU 26 about the running environment of the vehicle 10 via the tire air pressure indicator 21 (step S21 of FIG. 7). The command determination portion 112 refers to the adjustment permission-prohibition information stored in the memory portion 102, and determines whether pro-active adjustment of the tire internal air pressure is prohibited or not (step S22). If pro-active adjustment of the tire internal air pressure is prohibited (NO in step S22), it is not possible to perform the pro-active adjustment of the tire internal air pressure by the air adjustment electromagnetic valve 24 and the like.

On the other hand, if pro-active adjustment of the tire internal air pressure is permitted (YES in step S22), the pro-active adjustment of the tire internal air pressure is performed by the air adjustment electromagnetic valve 24 and the like. More specifically, the second adjustment air amount calculation portion 106 calculates the supplied air amount and the bled air amount that need to be supplied to or bled from the tire in order to realize a tire air pressure that is suitable for the running environment of the vehicle 10 (step S23). Next, the pump/valve control amount calculation portion 108 calculates the operating mode of the air pump 20 and the adjustment amount of the air adjustment electromagnetic valve 24 (step S24), and then drive of the air pump 20 and the air adjustment electromagnetic valve 24 is controlled in accordance with the control signal received from the pump/valve control amount calculation portion 108 (step S25). As a result, the tire internal air pressure is adjusted so as to become an air pressure that is suitable for the running environment of the vehicle 10.

According to the above-described embodiment, the adjustment of the tire internal air pressure is performed by referring to the vehicle speed. Further, pro-active adjustment of the tire internal air pressure is only performed when the vehicle speed is low, namely, when the G-switch is switched to OFF. Accordingly, it is only possible to perform pro-active adjustment of the tire internal air pressure when the vehicle speed is a low speed at which comparatively few technical problems occur. Moreover, while the adjustment of the tire internal air pressure is being performed, the transmission mode is set and fixed as the normal transmission mode. Accordingly, it is possible to reduce the transmission frequency at which the wheel side communication device 34 and the like transmit notification that an abnormality of the wheel 14 has occurred.

An example is described for the above embodiment in which the vehicle speed detection sensors 35 are provided in the wheels 14. However, the vehicle speed detection sensors 35 may be provided on the vehicle body 12. In this case, for example, the detection results of the vehicle speed detection sensors 35 can be transmitted by wire to the ECU 26, and the command determination portion 112 of the ECU 26 can determine whether or not it is possible to perform pro-active adjustment of the tire internal air pressure based thereupon. Further, a configuration may be adopted, which is similar to that of the first embodiment, in which the G-switch is switched to ON or OFF based on the special type of behavior of the tire internal air pressure which is taken to indicate whether the vehicle speed is equal to or above the predetermined value. Accordingly, with such a configuration, the special type of behavior of the tire internal air pressure is used to transmit information related to the vehicle speed to the transmission mode determination device 32 of the wheel 14.

Third Embodiment

In the following description of the third embodiment, structural elements that are the same as those of the first embodiment will be denoted with the same reference numerals, and a detailed explanation thereof will be omitted.

In the third embodiment, in addition to transmitting radio waves to the vehicle body side communication device 16, the wheel side communication device 34 is provided with a function that enables radio waves to be received from the vehicle body side communication device 16. Further, the vehicle body side communication device 16 is provided with a function that enables radio waves to be transmitted to the wheel side communication device 34, in addition to being able to receive radio waves from the wheel side communication device 34.

Figure 8:
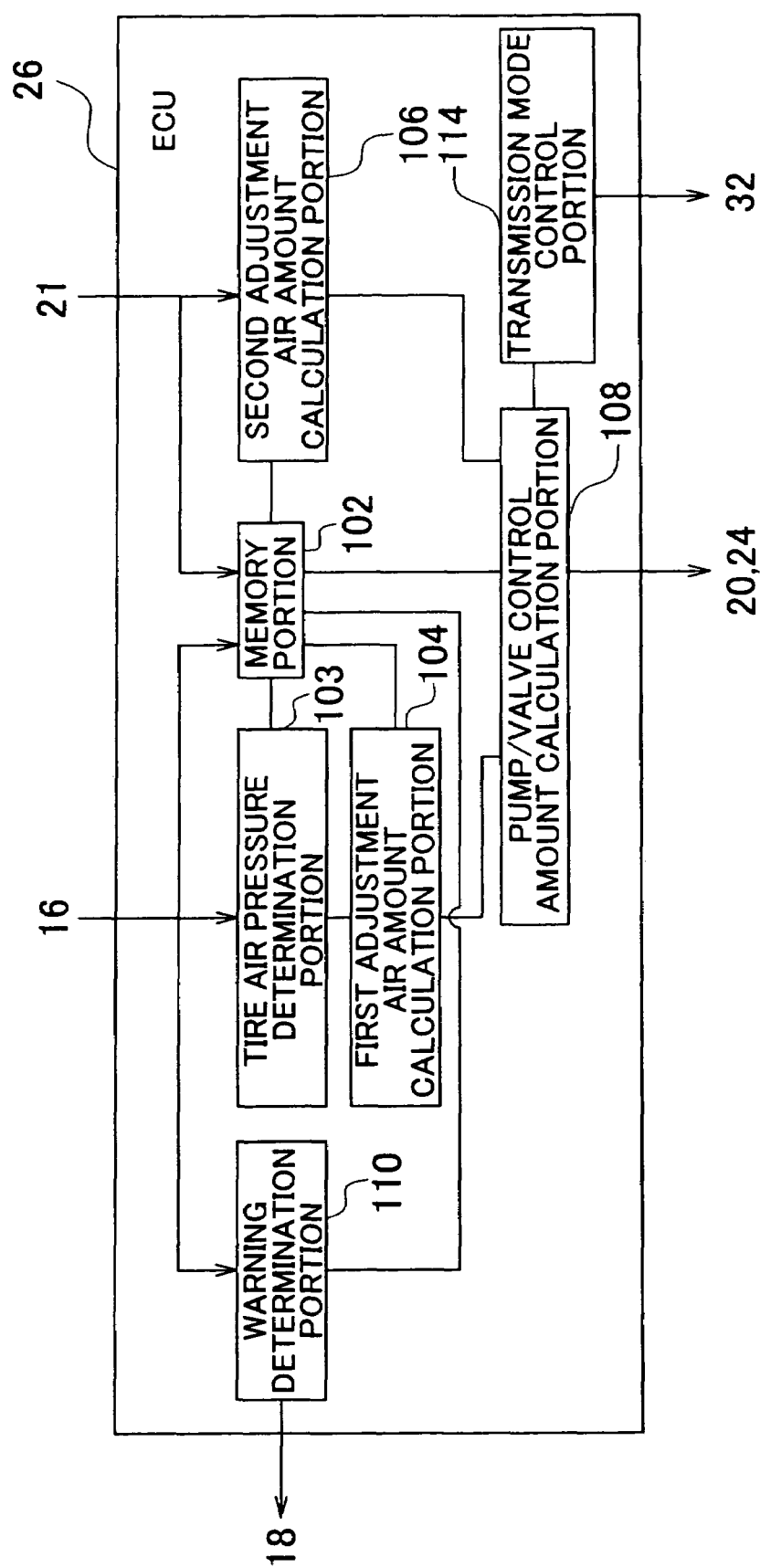
FIG. 8 is a function block diagram showing functions, among various different functions of an ECU according to a third embodiment, related to monitoring and adjustment of a tire internal air pressure.

FIG. 8 is a function block diagram showing functions, among various different functions of the ECU 26 according to this embodiment, related to monitoring and adjustment of the tire internal air pressure. The ECU 26, in addition to the structural elements of the first embodiment, is also provided with a transmission mode control portion 114 that is connected to the pump/valve control amount calculation portion 108. The transmission mode control portion 114 transmits operation information for each air adjustment electromagnetic valve 24 to each corresponding vehicle body side communication device 16, based on the detection results of the pump/valve control amount calculation portion 108.

The vehicle body side communication device 16 then transmits the operation information for the air adjustment electromagnetic valve 24 (which has been received from the transmission mode control portion 114 of the ECU 26) to the corresponding wheel side communication device 34. The wheel side communication device 34 then transmits the operation information for the air adjustment electromagnetic valve 24 received from the vehicle body side communication device 16 to the corresponding transmission mode determination device 32. Then, the transmission mode determination device 32 determines the transmission mode determination threshold value to be used based on the operation information for the air adjustment electromagnetic valve 24 received from the wheel side communication device 34. More particularly, when the air adjustment electromagnetic valve 24 is not operating, the first transmission mode determination threshold value is used, whereas when the air adjustment electromagnetic valve 24 is operating the second transmission mode determination threshold value is used.

The remaining structural elements of the third embodiment are the same as those of the first embodiment shown in FIGS. 1 to 4.

In the third embodiment, for example, when the driver or other vehicle user of the vehicle notifies the ECU 26 of the running environment of the vehicle 10 via the tire air pressure indicator 21, the ECU 26 calculates the supplied air amount and the bled air amount for the tire, and the operating mode of the air pump 20 and the adjustment amount of the air adjustment electromagnetic valves 24. The calculated results are then transmitted to the air pump 20 and the air adjustment electromagnetic valve 24. Next, the operation information for the air adjustment electromagnetic valves 24 that is derived from the calculation results of the pump/valve control amount calculation portion 108 is transmitted from the transmission mode control portion 114 of the ECU 26 to the corresponding transmission mode determination device 32 via the vehicle body side communication device 16 and the wheel side communication device 34. Accordingly, when the tire internal air pressure is being pro-actively adjusted by the air adjustment electromagnetic valve 24, the second transmission mode determination threshold value is used by the transmission mode determination device 32. On the other hand, when the tire internal air pressure is not being pro-actively adjusted by the air adjustment electromagnetic valve 24, the first transmission mode determination threshold value is used by the transmission mode determination device 32.

Moreover, when the tire internal air pressure is being adjusted in order to maintain the tire internal air pressure in the reference state based upon the detection result of the pressure detection sensor 30, in a similar manner to described previously, the operation information of the air adjustment electromagnetic valve 24 is transmitted from the transmission mode control portion 114 of the ECU 26 to the wheel side communication device 34. Then, the transmission mode determination device 32 determines whether the first transmission mode determination threshold value or the second transmission mode determination threshold value is to be used.

In the above described embodiment, the devices on the vehicle body 12 side and the devices on the wheel 14 side exchange information by two-way wireless communication, thus enabling the transmission mode determination threshold value that acts as the determination criterion for determining the transmission mode of the wheel side communication device 34 to be determined. Accordingly, when the air adjustment electromagnetic valves 24 are being operated to adjust the tire internal air pressure, the second transmission mode determination threshold value is used. As a result, it is possible to reduce the transmission frequency at which notifications related to the occurrence of an abnormality of the wheel 14 are transmitted, whereby it is possible to reduce the amount of power consumed by transmissions of the wheel side communication device 34.

It should be noted that the invention is not limited to the above described exemplary embodiments and configurations, and may be realized by appropriately replacing any of the various elements described in the above embodiments and configurations. Further, those skilled in the art will be able to conceive of various design changes and modifications of the above described embodiments. Such modified and changed embodiments are also intended to fall within the scope of the invention.

For example, in the above described embodiments, the transmission frequency of notifications related to the occurrence of an abnormality of the tire internal air pressure from the wheel side communication device 34 etc. is reduced by changing the transmission mode determination threshold value that acts as the reference criterion for the transmission mode of the wheel side communication device 34. However, other methods of achieving this reduction can be used. For example, while the wheel state adjustment device or means including the air adjustment electromagnetic valves 24 etc. is adjusting the tire internal air pressure, the notification related to the occurrence of abnormalities may be stopped by interrupting transmission by the wheel side communication device 34 of the detection result of the pressure detection sensor 30. Accordingly, it is possible to reduce the transmission frequency at which the wheel side communication device 34 etc. transmits notifications related to the occurrence of abnormalities of the tire internal air pressure. Thus, with this configuration, the transmission mode determination device 32 determines whether to continue or interrupt the periodic information transmissions of the wheel side communication device 34 based on the detection result of the pressure detection sensor 30, instead of by changing the transmission mode determination threshold value. Moreover, the wheel side communication device 34 may transmit the detection result of the pressure detection sensor 30 etc. based on information which is received from the corresponding transmission mode determination device 32 about whether continuation or interruption of the periodic information transmission has been determined.

Further, examples are described for the above embodiments in which, when, for example, the tire internal air pressure is increased, the indication signal that the tire internal air pressure is being adjusted by the air adjustment electromagnetic valve 24 etc. is realized by the tire internal air pressure being decreased once and then increased within a predetermined period of time. However, the invention is not limited to this configuration. For example, the indication signal that the tire internal air pressure is being adjusted may be realized by intermittently increasing or decreasing the tire internal air pressure. If such a configuration is adopted, it is preferable that the air pump 20 and the air adjustment electromagnetic valve 24 are controlled such that the tire internal air pressure exhibits behavior that does not usually occur during normal running of the vehicle 10.

Furthermore, examples are described for the above embodiments in which the tire internal air pressure is changed to suit the running environment when the driver or other vehicle user gives an instruction. However, the invention is not limited in this respect, and may be applied to, for example, a configuration in which (i) a vehicle speed sensor, a camera or the like are used to detect the running environment of the vehicle 10, and (ii) the tire internal air pressure is changed based on an automatic determination of the running environment based on the obtained detection results.

In addition, an explanation is presented for the above described first and second embodiments in which, when the second transmission mode determination threshold value is used for determination of the transmission mode of the wheel side communication device 34, the determination as to whether to return the transmission mode determination threshold value to the first transmission mode determination threshold value is based upon whether a predetermined time has elapsed since the second transmission mode determination threshold value was set. However, the invention is not limited to this configuration. For example, the invention may be realized such that when the adjustment of the tire internal air pressure by the air adjustment electromagnetic valve 24 etc. is completed, an indication signal indicating the completion of adjustment is transmitted to the transmission mode determination device 32. Accordingly, the transmission mode determination device 32 can determine whether to return the transmission mode determination threshold value from the second transmission mode determination threshold value to the first transmission mode determination threshold value based on the received indication signal. The indication signal that the adjustment of the tire internal air pressure is completed may, like the above described indication signal that tire internal air pressure is being adjusted, be transmitted to the transmission mode determination device 32 on the wheel 14 side from the devices on the vehicle body 12 side using the behavior of the tire internal air pressure.

Moreover, an example is described for the above embodiments in which it is determined whether or not an abnormality of the wheel 14 has occurred based on the absolute value and the change amount of the tire internal air pressure. However, the invention is not limited in this respect, and may be configured such that, for example, the differences of the transmission modes and the transmission frequencies of the wheel side communication device 34 are used as a basis for determining whether or not an abnormality of the wheel 14 has occurred. For example, if the information transmitted from the vehicle body side communication device 16 includes information indicating that the transmission mode of the wheel side communication device 34 is the normal transmission mode, or if the transmission frequency of transmissions from the wheel side communication device 34 to the vehicle body side communication device 16 is comparatively low, it is possible to determine that an abnormality of the wheel 14 has not occurred. Given this fact, the warning determination portion 110 need not activate the warning device 18. Alternatively, if the information transmitted from the vehicle body side communication device 16 includes information indicating that the transmission mode of the wheel side communication device 34 is the emergency transmission mode, or if the transmission frequency of transmissions from the wheel side communication device 34 to the vehicle body side communication device 16 is comparatively high, it is possible to determine that an abnormality of the wheel 14 has occurred. Accordingly, the warning determination portion 110 can activate the warning device 18 based on this fact.

What is claimed is:

1. A wheel state adjustment system comprising:
   a wheel state monitoring device which monitors a parameter indicative of the state of a wheel and which transmits a notification when an abnormality of the wheel occurs based on the monitored parameter; and
   a wheel state adjustment device that adjusts the parameter indicative of the state of the wheel, wherein the wheel state monitoring device reduces a transmission frequency at which the notification related to the occurrence of an abnormality of the wheel is transmitted when the wheel state adjustment device is adjusting the parameter indicative of the state of the wheel.

2. The wheel state adjustment system according to claim 1, wherein, when the wheel state adjustment device is adjusting the parameter indicative of the state of the wheel, the wheel state monitoring device reduces the transmission frequency at which the notification related to the occurrence of an abnormality of the wheel is transmitted by stopping transmission of the notification related to the occurrence of an abnormality of the wheel.

3. The wheel state adjustment system according to claim 1, wherein, when the wheel state adjustment device is adjusting the parameter indicative of the state of the wheel, the wheel state monitoring device reduces the transmission frequency at which the notification related to the occurrence of an abnormality of the wheel is transmitted by changing a determination condition for determining whether an abnormality of the wheel has occurred.

4. The wheel state adjustment system according to claim 1, wherein the wheel state adjustment device notifies the wheel state monitoring device that the wheel state adjustment device is adjusting the parameter indicative of the state of the wheel by manipulating the parameter indicative of the state of the wheel in a predetermined manner.

5. The wheel state adjustment system according to claim 4, wherein the wheel state adjustment device notifies the wheel state monitoring device that the parameter indicative of the state of the wheel is being adjusted by manipulating the parameter indicative of the state such that the predetermined quantity of state exhibits a type of behavior that is not normal.

6. The wheel state adjustment system according to claim 1, wherein the wheel state adjustment device adjusts the parameter indicative of the state of the wheel by referring to a monitoring result for the parameter indicative of the state of the wheel that is obtained from the wheel state monitoring device.

7. The wheel state adjustment system according to claim 1, wherein the wheel state adjustment device adjusts the parameter indicative of the state of the wheel by referring to a speed of a vehicle to which the wheel is attached.

8. The wheel state adjustment system according to claim 1, wherein the parameter indicative of the wheel is an internal air pressure of a tire of the wheel.

9. The wheel state adjustment system according to claim 1, further comprising a warning device that generates a warning based on the notification related to the occurrence of an abnormality of the wheel that is obtained from the wheel state monitoring device.

10. A wheel state adjustment method for a wheel state adjustment system, comprising the steps of:
    monitoring a parameter indicative of the state of a wheel and transmitting a notification when an abnormality of the wheel occurs; and
    adjusting the parameter indicative of the state of the wheel; and
    reducing a transmission frequency at which the notification related to the occurrence of an abnormality of the wheel is transmitted when the parameter indicative of the state of the wheel is being adjusted.

11. The wheel state adjustment method according to claim 10, wherein, when the parameter indicative of the state of the wheel is being adjusted, the transmission frequency at which the notification related to the occurrence of an abnormality of the wheel is transmitted is reduced by stopping transmission of the notification related to the occurrence of an abnormality of the wheel.

12. The wheel state adjustment method according to claim 10, wherein, when the parameter indicative of the state of the wheel is being adjusted, the transmission frequency at which the notification related to the occurrence of an abnormality of the wheel is transmitted is reduced by changing a determination condition for determining whether an abnormality of the wheel has occurred.

13. The wheel state adjustment method according to claim 10, wherein the monitoring step monitors whether the parameter indicative of the state of the wheel is being adjusted based on whether the parameter indicative of the state is manipulated in a predetermined manner.

14. The wheel state adjustment method according to claim 13, wherein the monitoring step monitors whether the parameter indicative of the state of the wheel is being adjusted based on whether the parameter indicative of the state of the wheel is changed such that the parameter indicative of the state exhibits a type of behavior that is not normal.

15. The wheel state adjustment method according to claim 10, wherein the step of adjusting the parameter indicative of the state of the wheel is performed by referring to a monitoring result for the parameter indicative of the state of the wheel.

16. The wheel state adjustment method according to claim 10, wherein the step of adjusting the parameter indicative of the state of the wheel is performed by referring to a speed of a vehicle to which the wheel is attached.

17. The wheel state adjustment method according to claim 10, wherein the step of monitoring the parameter indicative of the state of the wheel is based upon measurement of an internal air pressure of a tire of the wheel.

18. The wheel state adjustment method according to claim 10, further comprising a step of generating a warning based on the notification related to the occurrence of an abnormality of the wheel.

19. A wheel state adjustment system comprising:
   wheel state monitoring means for monitoring a parameter indicative of the state of a wheel and for transmitting a notification when an abnormality of the wheel occurs based on the monitored parameter; and
   wheel state adjustment means for adjusting the parameter indicative of the state of the wheel, wherein the wheel state monitoring means reduces a transmission frequency at which the notification related to the occurrence of an abnormality of the wheel is transmitted when the wheel state adjustment means is adjusting the parameter indicative of the state of the wheel.

* * * * *